United States Patent [19]

Kelly

[11] Patent Number: 5,097,182

[45] Date of Patent: Mar. 17, 1992

[54] POWER SUPPLY FOR A GAS DISCHARGE LAMP

[76] Inventor: Allen D. Kelly, 120 Old Pine Cir., Racine, Wis. 53402

[21] Appl. No.: 600,395

[22] Filed: Oct. 19, 1990

[51] Int. Cl.$^5$ .................... H05B 41/36; H05B 41/38
[52] U.S. Cl. .................................. 315/219; 315/224; 315/307; 315/DIG. 7
[58] Field of Search ............... 315/209 R, 219, 224, 315/226, 291, 307, 308, DIG. 4, DIG. 5, DIG. 7

[56] References Cited

U.S. PATENT DOCUMENTS

| | | | |
|---|---|---|---|
| Re. 32,904 | 4/1989 | Pacholok | 363/131 |
| 4,127,797 | 11/1978 | Perper | 315/209 R |
| 4,254,362 | 3/1981 | Tulleners | 315/219 |
| 4,307,334 | 12/1981 | Peil et al. | 323/351 |
| 4,572,990 | 2/1986 | Leale et al. | 315/220 |
| 4,629,946 | 12/1986 | Amano et al. | 315/219 |
| 4,682,081 | 7/1987 | Sikora | 315/219 |
| 4,682,082 | 7/1987 | MacAskill et al. | 315/219 |
| 4,800,323 | 1/1989 | Sikora | 315/219 |
| 4,891,561 | 1/1990 | Amano et al. | 315/223 |
| 4,904,904 | 2/1990 | Zarate | 315/219 |
| 4,916,362 | 4/1990 | Orenstein | 315/219 |
| 4,933,612 | 6/1990 | Bonin | 315/307 |
| 4,992,702 | 2/1991 | Shimizu et al. | 315/219 |

Primary Examiner—David Mis
Attorney, Agent, or Firm—Jansson & Shupe, Ltd.

[57] ABSTRACT

The improved power supply includes a source of DC power and a start-up section connected to such source. A power transistor section is connected to the start-up section and receives an initiating current signal from it. A transformer section has a primary winding connected to the power transistor within the power transistor section and provides output power to a lamp in response to a current flowing in the primary winding. A feedback section is coupled to the transformer section for providing a current mode feedback signal and a control section is coupled to the transformer section and derives a control signal from such transformer section. The control signal has a characteristic which is a function of the current in the primary winding and the power supply is thereby made self-timing. The control section is used to switch the power transistor to a non-conducting state, thereby terminating the flow of current through the primary winding of the transformer. The power transistor is brought to a non-conducting state prior to saturation of the transformer core. Optional features and other embodiments are also described.

15 Claims, 4 Drawing Sheets

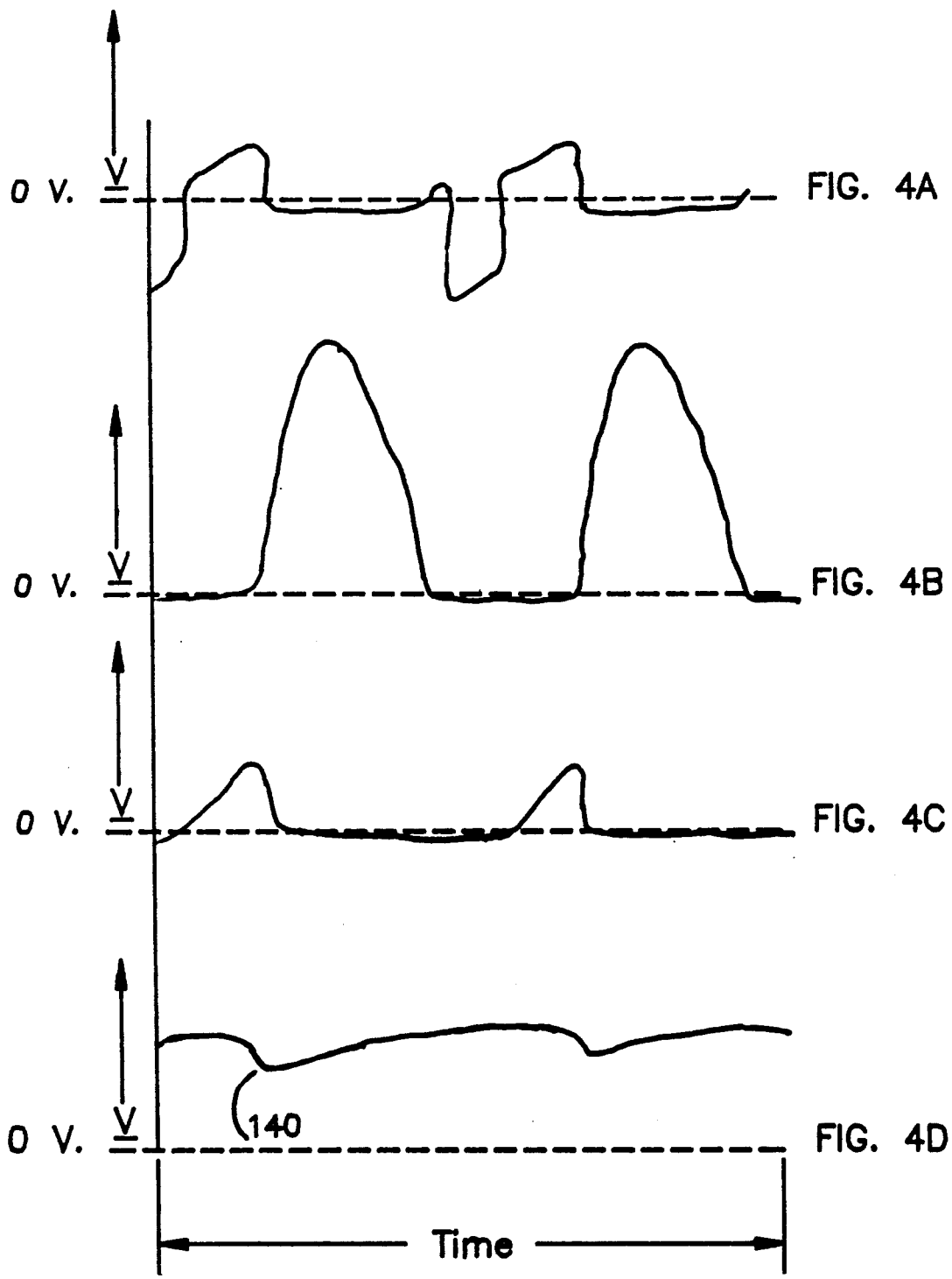

POWER SUPPLY FOR A GAS DISCHARGE LAMP

FIELD OF THE INVENTION

This invention is related generally to power supplies and, more particularly, to a non-saturating power supply which is resonant mode and current mode controlled, self-oscillating and capacitive load compensating. The power supply is particulary useful for gas discharge lamps such as neon lamps.

BACKGROUND OF THE INVENTION

Neon tubes, such as are used for signs, ornate displays and the like, require high voltages at relatively low current levels. Such voltages are on the order of several hundred to several thousand volts and stimulate the inert gas contained within the tube to the degree necessary to produce visible light.

Examples of power supplies used for such a purpose are shown and described in Sikora U.S. Pat. Nos. 4,682,081 and 4,800,323. The power supplies shown therein include a transformer with a primary winding, the current flow through which is controlled by a power transistor. The power supplies shown in the aforementioned Sikora patents use a voltage sensing circuit which is connected to the base of the power transistor. Such sensing circuit limits the current flowing in the primary transformer winding. The current limiting circuit is selected to prevent saturation of the magnetic core of the transformer. The Sikora power supplies are current mode controlled and employ capacitors connected in the secondary of the transformer. These capacitors are discharged during each power supply "cycle,38 thereby causing the connected stroboscopic light to be intermittently energized and emit a brief but brilliant flash of light.

Even though current mode controlled, the Sikora power supplies fail to recognize improvements in reliability which could be obtained. Such improvements result when the "turn off" signal to the main power transistor is maintained for a time slightly in excess of the time required to actually turn such transistor off as well as the propagation time delay of the current control network following detection of the peak of each current pulse.

Another power supply for gas discharge lamps is shown in Pacholok U.S. Pat. No. Re. 32,904, a reissue of U.S. Pat. No. 4,613,934. The circuit shown in the Pacholok patent uses a power transistor to control the flow of current through the primary winding of the transformer. The "turn-off" point of the power transistor is controlled by a switching transistor, the collector of which is connected to the feedback winding and the base of which is connected to the primary winding.

Yet another power supply for neon tubes is shown in Pacholok U.S. Pat. No. 4,698,741. The circuit shown in such patent uses two transistors in series to control primary winding current and a third switching transistor to turn off one of the foregoing two transistors, thereby preventing further flow of current in the primary winding.

Neither the Pacholok power supplies nor those shown in the Sikora patents recognize the advantages of a circuit which derives a control signal directly from primary winding current and uses such control signal to control the supply "turnoff" point based on a peak primary current, the amplitude of which may be selected by the user based on lamp brightness In addition, gas discharge lamps present a load, the capacitive time constants of which may change. The circuits shown in the foregoing patents fail to appreciate how a gas discharge lamp power supply may be arranged to substantially maintain the selected peak current in spite of changes in such time constants and consequent changes in oscillation frequency.

Further, the power supplies discussed above have failed to appreciate the advantages of using both terminals of a feedback winding for power supply control. More specifically, such prior power supplies do not appreciate the advantages of using one terminal of such winding to obtain an oscillator feedback signal and resolve it to an A.C. component used to supply a "turn on" signal and a D.C. component for control circuit bias and other functions. The advantages of using a second terminal of the feedback winding to provide sequential signals which alternately aid in turning on the power transistor and in turning it off are also unappreciated by the prior patents mentioned above.

Other shortcomings of earlier work in this field will become apparent from the description set forth below.

OBJECTS OF THE INVENTION

It is an object of this invention to overcome some of the problems and shortcomings of the prior art.

Another object of this invention is to provide an improved power supply wherein the peak primary current may be selected by the user.

Another object of this invention is to provide an improved power supply which uses a control signal to enable such selection of the primary current, such control signal being a function of the current flowing in the primary winding.

Yet another object of this invention is to provide an improved power supply having a feedback signal which is resolved to an alternating current (AC) component and a direct current (DC) component.

Still another object of this invention is to provide an improved power supply wherein such AC component is used to generate an oscillation feedback signal.

Another object of this invention is to provide an improved power supply wherein the DC component of the feedback signal is used to generate a bias voltage.

Yet another object of this invention is to provide an improved power supply which substantially maintains the selected peak current in spite of changes in the reflected capacitive load impedance and consequent changes in oscillation frequency.

Another object of this invention is to provide an improved power supply wherein both terminals of a feedback winding are used to derive signals used for power supply control.

Another object of this invention is to provide an improved power supply which may include an optional diode-capacitor network for improving power supply stability when it is used to power loads having distributed capacitance.

Still another object of this invention is to provide an improved power supply wherein the "turn off" signal to the main power transistor is maintained for a time selected in recognition of the time required to actually turn such transistor off and of the propagation time delay of the current control network.

These and other important objects will be apparent from the descriptions of this invention which follow.

SUMMARY OF THE INVENTION

The improved power supply includes a source of DC power and a start-up section connected to such source. A power transistor section, which includes a power transistor, is connected to the start-up section and receives an initiating current signal from it. A transformer section has a primary winding connected to the power transistor and provides output power to a lamp in response to a current flowing in the primary winding.

A feedback section is coupled to the transformer section for providing a plurality of feedback signals including a first feedback signal resolved to an AC component and a DC component and a second feedback signal for aiding in switching the power transistor on and off. A control section is coupled to the transformer section and derives a control signal from such transformer section. The control signal has a characteristic which is a function of the current in the primary winding and such control signal is used to switch the power transistor to a nonconducting state.

The control section further includes a delay circuit for maintaining the power transistor in a nonconducting state for a time selected in view of the turnoff time of the power transistor and the propagation time delay of the control section. The power supply is thereby switched at a frequency which adapts to reflected capacitive load impedance.

In a highly preferred embodiment, the control signal is a current signal derived by flowing the current in the primary winding through a resistive element. The control section includes a sensing amplifier or transistor for sensing this control current signal and using it cause the power transistor to be switched to a nonconducting or "off" state, thereby terminating the flow of current through the primary winding of the transformer. The power transistor is brought to a non-conducting state prior to saturation of the transformer core.

Referring again to the feedback section, it serves two primary functions. Such feedback section includes the feedback winding having a first terminal and a second terminal. It is to be appreciated that the voltage signals available at these terminals are substantially in phase with one another but of opposite polarity. The first terminal provides the first feedback signal at a first polarity. This feedback signal is resolved to an AC component and a DC component, the former being used to generate an oscillation feedback signal applied to the base of a feedback transistor Q3. This transistor has the effect of "inverting" the polarity of the AC component. The collector-emitter circuit of the transistor Q3 thereby switches the power transistor to a fully conducting state. The DC component of the feedback signal is used to generate a bias voltage which is applied to the control section.

The second terminal of the feedback winding provides a second feedback signal which is coupled through a resistor to the base of the power transistor. Near the beginning of each power cycle (and following the initiating activity of the start-up section and initial conduction of current in the primary winding), this second feedback signal provides a current signal which complements the effect of the oscillation feedback signal in bringing the power transistor to a fully conducting state. Near the end of each power cycle, the second feedback signal also aids in switching the power transistor off.

The inventive power supply may incorporate either or both of two optional features. One feature involves a diode-capacitor network within the feedback section for improving the stability of the power supply when such power supply is used to drive loads having distributed capacitance. Although this diode-capacitor network has proven to be effective in that way, the precise reason for its efficacy is not known.

Another optional feature involves an adjustable resistor in the control transistor network. The resistive value of such resistor may be manipulated for controlling the brightness of the lamp. This adjustable resistor can be embodied as a conventional potentiometer or as an electrical element having an "apparent" resistance which can be rapidly changed to provide special effects with the lamp. Special effects may also be obtained by applying a voltage at an indicated node in the control transistor network.

The improved power supply is non-saturating, self-adjusts its oscillating frequency with changes in load characteristics and yet substantially maintains a peak current value (and therefore a level of lamp brightness) as may be selected by the user.

BRIEF DESCRIPTION OF THE DRAWINGS

FIG. 4A is a representative curve of the current flowing in the base of the power transistor.

FIG. 4B is a representative curve of the collector-to-emitter voltage of the power transistor which controls the primary winding of the power supply.

FIG. 4C is a representative curve of the voltage across the resistive element through which the primary winding current flows to derive the control signal described in greater detail in the specification.

FIG. 4D is a representative curve of the collector current of a sensing transistor described in the specification.

DETAILED DESCRIPTIONS OF PREFERRED EMBODIMENTS

Figure 1:
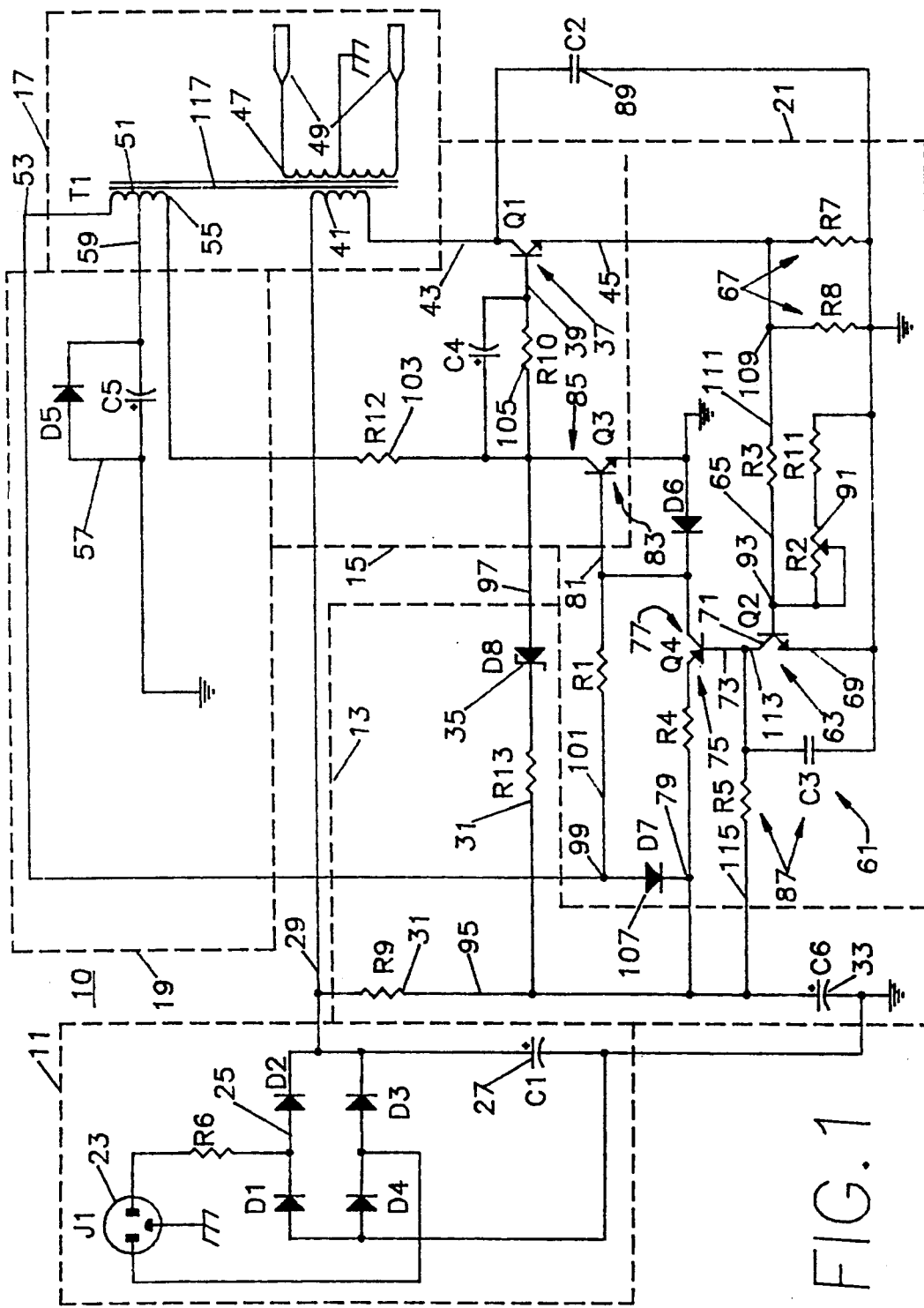
FIG. 1 is an electrical circuit diagram of a first embodiment of the inventive power supply.

Referring to FIG. 1, some of the primary constituents of the improved power supply 10 include a source of DC power 11, a start-up section 13, a power transistor section 15, a transformer section 17, a feedback section 19 and a control section. Details of each section are described below.

The source of DC power 11 includes an input jack 23 for connecting the power supply 10 to an electrical source such as 120 volt 60 Hz. A full wave bridge rectifier 25 is connected to the jack 23 and a filter capacitor 27 to the rectifier 25. The output of the source 11, as measured on line 29, is preferably about 165 volts DC. It is to be appreciated from the foregoing that if filtered DC power of the appropriate voltage is otherwise available, such is entirely suitable as input power to the supply 10.

The start-up section 13 is connected to the source 11 and includes a pair of resistors 31, a "bootstrap" capacitor 33 and a Zener diode 35. As is further described below, the start-up section 13 provides a current signal which initiates switching of the power transistor 37 toward a saturated or fully conducting state. The power transistor section 15 is connected to the start-up section 13 and receives the initiating current signal from such section 13. The initiating current signal is manifested at the Zener diode 35 and applied to the base 39 of the power transistor 37.

The primary winding 41 of the transformer section 17 is connected to the power transistor section 15. More specifically, such primary winding 41 is in series with the collector 43 and emitter 45 of the power transistor 37. The secondary winding 47 of the transformer section 17 provides a high output voltage to a gas discharge lamp connected across the output terminals 49 of such secondary winding 47.

The feedback section 19 is embodied as a separate feedback winding 51 disposed on a common core 117 with the primary winding 41 and the secondary winding 47. The feedback winding 51 has a first terminal 53 and a second terminal 55, the functions of which are described below. A diode-capacitor network 57 is connected in series between the center tap 59 of the feedback winding 51 and ground. Such network 57 is optional and has been demonstrated to improved stability of the power supply 10 when used with loads having distributed capacitance. There is uncertainty as to why such improved stability results.

A control section 21 is connected to the emitter 45 of the power transistor 37 and includes a control transistor network 61 having a sensing transistor 63, the base 65 of which is connected to a resistive element 67. The resistive element 67 is embodied as a pair of resistors in parallel since two resistors are preferred for ease of substitution and adjustability of performance characteristics. However, once such characteristics are fixed, a single resistor may be used in place of two resistors.

The emitter 69 of the sensing transistor 63 is connected to ground and its collector 71 is connected to the base 73 of a first control transistor 75. The emitter-collector circuit 77 of the transistor 75 is connected between the node 79 and the base 81 of the oscillation feedback transistor 83. The collector-emitter circuit 85 of the feedback transistor 83 is connected between the base 39 of the power transistor 37 and ground.

A delay circuit 87 is incorporated into the control section 21 and once the sensing transistor 63 is switched to a conducting state (thereby turning off the power transistor 37 as described below), the delay circuit 87 maintains such conducting state for a brief time. This time is selected in view of the decay time of the power transistor 37 (the time required to switch from a fully conducting to a fully nonconducting state) and in view of the propagation time delay of the control section 21 after each peak of a primary winding current pulse is detected. In part, the propagation time delay is a function of the primary-side tank resonant circuit comprised of the primary winding 41 and the capacitor 89. In a highly preferred embodiment, the delay circuit 87 is embodied as an R-C circuit.

The very brief time interposed by the delay circuit 87 helps assure that the power supply 10 does not "force" the next positive cycle of primary winding current. So-called "forcing" would occur if such next positive cycle were initiated prior to the time at which the "flyback" negative-polarity electromotive force (EMF) had substantially dissipated. Such EMF results from switching the power transistor 37 off and terminating flow of current in the primary winding 41.

The improved power supply 10 also includes an optional adjustable resistor 91, the value of which may be manipulated for controlling the brightness of the lamp connected to the terminals 49. The value of this resistor 91 may be manually changed on an occasional basis for controlling lamp brightness. On the other hand, highly creative "special effects" are obtained by rapidly changing the resistive value, either at random or in accordance with a pre-determined pattern From the foregoing, it will be apparent that the adjustable resistor 91 per se may be replaced by an electrical device which "looks like" a resistor in the circuit and which has resistor-like characteristics which may be rapidly, electronically changed. Special effects may also be obtained by applying a DC or modulated voltage at the node 93 in the control transistor network 61.

In operation, the power supply 10 is energized by connecting the source 11 to AC power. Upon energization and during what is called the "charge" or power-output portion of the cycle, the start-up section 13 receives a voltage at the line 95 which charges the bootstrap capacitor 33 and the capacitor in the delay circuit 87. When the potential across the capacitor 33 rises to slightly exceed the breakdown or "avalanche" voltage of the Zener diode 35, an initiating pulse of current flows through the line 97 to the base 39 of the power transistor 37, thus switching the transistor 37 from a non-conducting state toward (but not to) a saturated or fully conducting state. Current of reduced magnitude thereupon flows through the primary winding 41 and the collector 43 and emitter 45 of the transistor 37, through the resistive element 67 and thence to ground.

Such flowing current induces an EMF in the secondary winding 47 (for illuminating the lamp) and in the feedback winding 51. As a result of the EMF induced in the feedback winding 51, voltages are available at the first terminal 53 and the second terminal 55. For descriptive purposes, the voltage at the second terminal 55 is referred to as the "direct" voltage while that at the first terminal 53 is referred to as the "inverted" voltage. Such voltages are substantially in phase and of opposite polarity. The inverted voltage at the first terminal 53 of the feedback winding 51 is present at node 99, providing a current resolved to an AC component and a DC component.

The AC component flows along the line 101 to the base 81 of the oscillation feedback transistor 83, thereby providing an oscillation feedback signal. This feedback signal is such as to switch the feedback transistor 83 toward the conducting state, thereby "re-inverting" the oscillation feedback signal and complementing or reinforcing the effect of the direct voltage at the second terminal 55. That is, such direct voltage provides a feedback current through the resistors 103 and 105 so as to also switch the power transistor 37 more toward a fully conducting state. The combined effect of the oscillator feedback signal and the feedback current is to switch the transistor 37 to a fully conducting state and to switch it more rapidly to a non-conducting state. Such fully conductive state occurs within about a cycle or two of energizing the power supply.

The DC component, that which flows through the rectifier 107, is filtered by capacitor 33 and the resulting DC voltage provides a bias voltage to the control transistor network 61.

Considering again the resistive element 67 and the control transistor network 61, the current flowing in the primary winding 41 flows through the resistive element 67 and the resulting voltage at the node 109 produces a current at the line 111. This current mode control signal is used during what is called the "discharge" part of the cycle during which no power is supplied to the lamp. Such current mode control signal is applied to the control transistor network 61 for switching the power transistor 37 to a non-conducting state, thereby terminating the flow of current through the primary winding 41. More specifically, the current mode control signal is applied to the base of the sensing transistor 63, switching it to a conducting state. Since the node 113 is connected to the line 115, current flows through the collector-emitter circuit of the transistor 63 which is connected to the base 73 of the first control transistor 75. This switches the transistor 75 to a conducting state.

The resulting current flowing through the emitter-collector circuit of transistor 75 switches the feedback transistor 83 to a fully conducting state. It is to be noted that during the discharge part of the cycle, the voltages at the terminals 53, 55 of the feedback winding 51 are at polarities opposite those which prevailed during the charge part of the cycle. Such voltages are therefore ineffective in switching the power transistor 37 toward a conducting state. As a result, the conductive collector 71 and emitter 69 of the transistor 63 "sinks" the positive voltage at the base of the transistor 37 to ground, turning it off. The power transistor 37 is thereby switched from a conducting state to a non-conducting state prior to saturation of the core 117.

The delay circuit 87 interposes a very brief, "hysteresis-like" time delay which helps assure that the power supply 10 does not force the next positive cycle of primary winding current. The foregoing arrangement causes the power supply 10 to accomodate changes in the capacitive time constants imposed by a slightly-changing load. Such changes in capacitive time constants will change the frequency of operation of the supply 10 while yet permitting it to maintain the peak current value which has been selected by the user in manipulating the value of the resistor 91.

Figure 2:
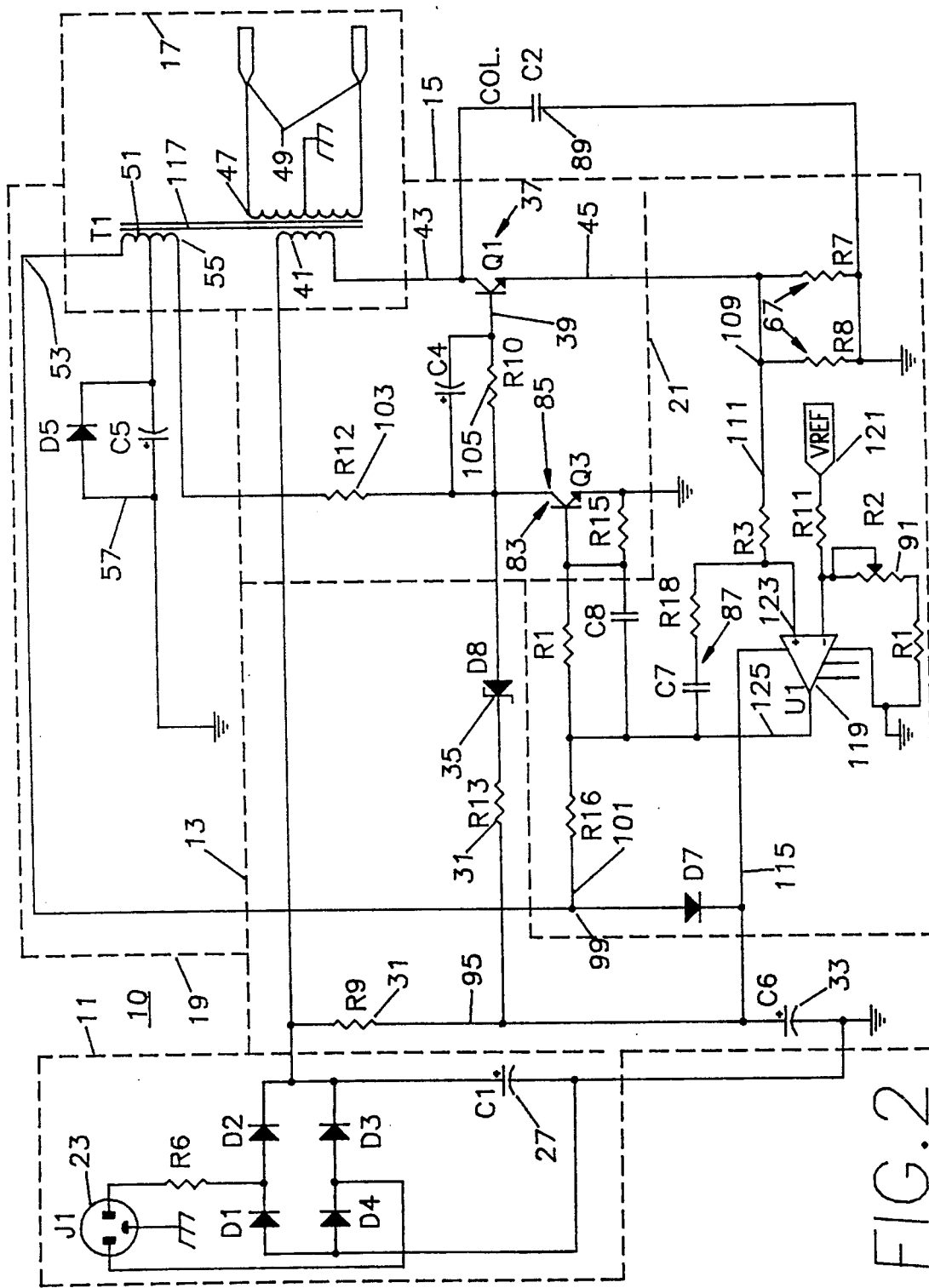
FIG. 2 is an electrical circuit diagram of a second embodiment of the inventive power supply.

Referring next to FIG. 2, a second embodiment of the power supply 10 differs only slightly from the first. In the second embodiment, the sensing transistor 63 and the first control transistor 75 are replaced by an operational amplifier or comparator 119. A reference voltage 121 is connected to the amplifier 119 and the current mode voltage control signal on line 111 is connected to the input 123 of the amplifier 119. When the value of the voltage 121 control signal slightly exceeds the value of the reference voltage, an output current signal appears at the terminal 125 of the amplifier 119. This current signal is directed to the base 81 of the feedback transistor 83, thereby switching the transistor 83 to a fully conducting state. Conduction of the transistor 83 "sinks" the base of the power transistor 37 to ground, thereby turning it off.

Figure 3:
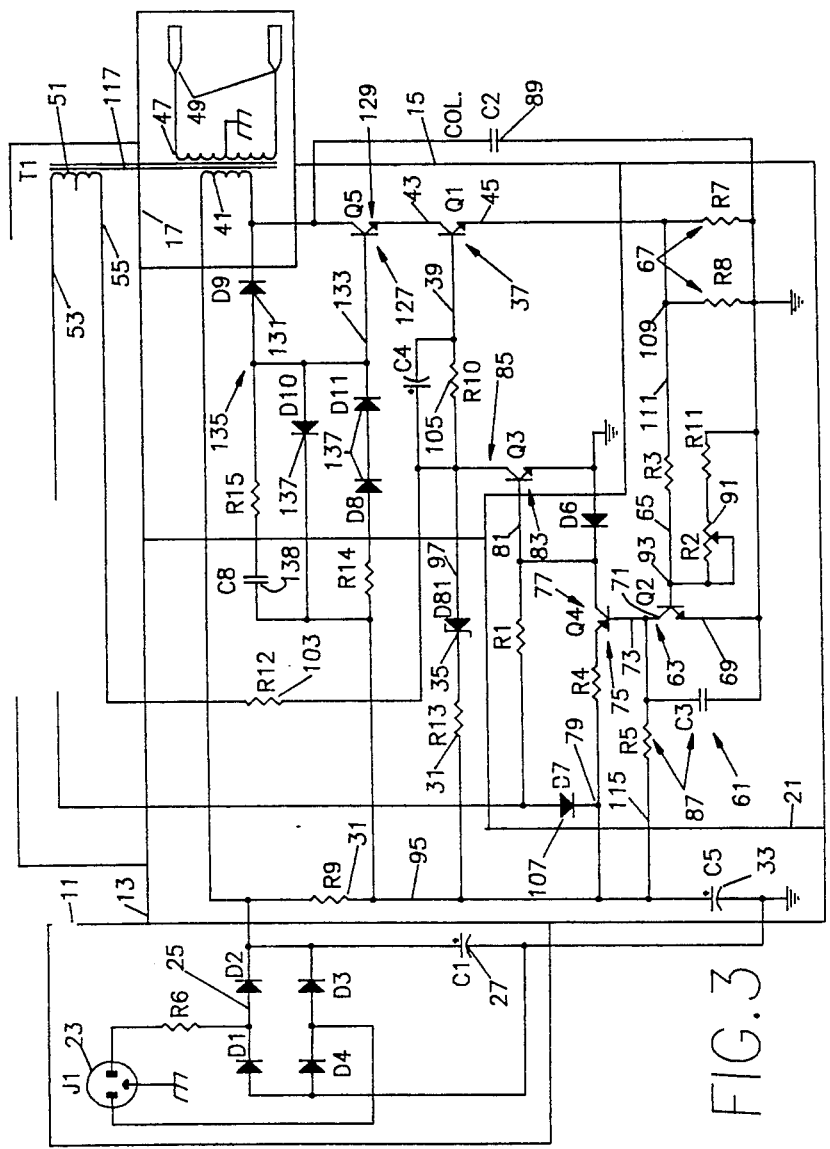
FIG. 3 is an electrical circuit diagram of a third embodiment of the inventive power supply.

Referring next to FIG. 3, a third embodiment of the power supply 10 includes a second power transistor 127, the collector-emitter circuit 129 of which is in series with the collector 43 and emitter 45 of the first power transistor 37. A diode 131 provides what is known as a Baker clamp 135 which limits the charge carriers and peak voltage to the base 133 of the second power transistor 127 when its collector-emitter circuit 129 is conducting. The Baker clamp 135 performs this function by providing a unidirectional current path for excess voltage potential at the base 133 of the second power transistor 127. The diodes 137 provide a means for discharging the capacitor 138 to assure that the second transistor 127 is turned off when power is removed.

The use of such emitter-driven or cascoded circuitry as shown in FIG. 3 provides two operational advantages important in certain applications One advantage is the provision of what is known as a reverse bias safe operating area which is greatly extended. Extension of such operating area enables the second power transistor 127 to reliably conduct higher current at higher voltage levels, a feature well suited for voltage levels found in Europe.

Another advantage is that the effect of what are called the Miller capacitances are significantly reduced. The first power transistor 37 may be a lower voltage, faster, higher-beta device which permits simpler, more efficient base drive circuitry to the first power transistor 37. Further, the first power transistor 37 can be a MOSFET. The power supply 10 is thus designed to operate at higher frequencies.

FIG. 4A shows a representative curve of the current flowing in the base 39 of the power transistor 37 and FIG. 4B shows a representative curve of the collector-to-emitter voltage of the same power transistor 37. FIG. 4C shows a representative curve of the voltage across the resistive element 67 through which the primary winding current flows to derive the voltage control signal.

FIG. 4D shows a representative curve of the collector current of the sensing transistor 63. The "dip 140" in the curve of FIG. 4D illustrates the effect of the delay circuit 87, such dip 140 being sustained by the operation of such circuit 87. FIGS. 4A–4D are depicted on the same time line to illustrate the relative timing and duration of each voltage or current shown.

The following components are useful in constructing the inventive power supply 10. The transformer is made by Custom Coils, Inc. of Alcester, S.D.:

| Reference | Value |
|---|---|
| First Embodiment | |
| C1 | 160 uF |
| C2 | .022 uF |
| C3 | 4700 pF |
| C4 | 3.3 uF |
| C5 | 47 uF |
| C6 | 100 uF |
| D1, D2, D3 | |
| D4, D5 | 1N4005 |
| D6 | 1N4148 |
| D7 | 1N4935 |
| D8 | 5V |
| Q1 | BUT11A |
| Q2 | 2N3904 |
| Q3 | 2N4401 |
| Q4 | 2N3906 |
| R1 | 470 |
| R2 | 10K |
| R3 | 1K |
| R4 | 100 |
| R5 | 2.2k |
| R6 | 1.0 |
| R7 | 3.3 |
| R8 | 2.0 |
| R9 | 100k |
| R10, R12 | 10 |
| R11 | 680 |
| R13 | 9.1K |
| T1 | Type 4407A |
| Second Embodiment | |
| C1, C5 | 47 uF |
| C2 | .022 uF |
| C4 | 3.3 uF |
| C7, C8 | 220 PF |

-continued

| Reference | Value |
| --- | --- |
| D1, D2, D3 | |
| D4, D5 | 1N4005 |
| D6 | 1N4935 |
| D7 | 5V |
| J1 | PLUG AC MALE |
| Q1 | BUT11A |
| Q3 | 2N4401 |
| R1, R12 | 1K |
| R6 | 1.0 |
| R7 | 3.3 |
| R8 | 2.0 |
| R9 | 100K |
| R10, R12 | 10 |
| R13 | 9.1K |
| R3 | 4.7K |
| R18 | 10K |
| R16 | 1K |
| R2 | 10K |
| R/5 | 470 |
| T1 | TYPE 4407A |
| U1 | LM741 |
| Third Embodiment | |
| C8 | 0.01 uF |
| R15, R14 | 50 |
| D8, D10 | |
| D11 | 1N4148 |
| D9 | 1N4937 |
| Q5 | |

While the principles of this invention have been described in connection with specific embodiments, it should be understood clearly that these descriptions are made only by way of example and are not intended to limit the scope of the invention.

What is claimed is:

1. An improved power supply for a gas discharge lamp including:
   a source of DC power;
   a start-up section connected to the source of DC power;
   a power transistor section connected to the start-up section and receiving an initiating current signal therefrom, such power transistor section including a first power transistor;
   a transformer section having a primary winding connected to the power transistor, such transformer section providing output power to a lamp in response to the current flowing in the primary winding;
   a feedback section coupled to the transformer section for providing a plurality of feedback signals including an inverted feedback signal resolved to an AC component and a DC component and a direct feedback signal, the AC component and the direct feedback signal complementing one another in switching the power transistor on and off;
   a control section coupled to the transformer section and deriving a control signal therefrom, such control signal having a characteristic which is a function of the current in the primary winding, such control signal being used to switch the power transistor to a nonconducting state;
   such control section further including a delay circuit for maintaining the power transistor in a nonconducting state for a time selected in view of the decay time of the power transistor and the propagation time delay of the control section;
   the power supply thereby switching at a frequency which is adapted to reflected capacitive load reactances.

2. The power supply of claim 1 wherein the control signal is a current signal derived by flowing the current in the primary winding through a resistive element.

3. The power supply of claim 2 wherein the control section includes a sensing transistor for sensing the control current signal and wherein the delay circuit is embodied as a resistor-capacitor circuit connected to such sensing transistor.

4. The power supply of claim 3 wherein the transformer section includes a transformer having a core and wherein the power transistor is switched from a conducting state to a non-conducting state prior to saturation of the core.

5. The power supply of claim 1 wherein the control section includes a control transistor network having an adjustable resistor and wherein the value of such adjustable resistor may be changed for controlling the brightness of the lamp.

6. The power supply of claim 4 wherein the control transistor network has an adjustable resistor and wherein the value of such adjustable resistor may be changed for controlling the brightness of the lamp.

7. The power supply of claim 1 wherein the feedback section has a feedback winding with a first terminal and a second terminal, wherein the inverted feedback signal is obtained from the first terminal and has a first polarity and wherein the direct feedback signal is obtained from the second terminal and has a second polarity.

8. The power supply of claim 7 wherein the power transistor has a base lead, wherein the AC component of the inverted feedback signal is used to generate an oscillation feedback signal and wherein such feedback signal is applied to the base of the power transistor, thereby switching the power transistor toward a fully conducting state.

9. The power supply of claim 7 wherein the DC component generates a bias voltage and wherein such bias voltage is applied to the control section.

10. The power supply of claim 8 wherein the DC component generates a bias voltage and wherein such bias voltage is applied to the control section.

11. The power supply of claim 1 wherein the direct feedback signal aids in bringing such power transistor to a fully conducting state, such direct feedback signal providing such function near the beginning of each power cycle.

12. The power supply of claim 11 wherein the feedback section further includes a diode-capacitor network for improving the stability of the power supply when such power supply is used to power loads having distributed capacitance.

13. The power supply of claim 1 wherein the feedback section further includes a diode-capacitor network for improving the stability of the power supply when such power supply is used to power loads having distributed capacitance.

14. The power supply of claim 1 wherein the first power transistor has a collector emitter circuit, wherein the power supply further includes a second power transistor having a collector-emitter circuit and wherein the collector-emitter circuits of the power transistors are in series with one another.

15. The power supply of claim 14 wherein the second power transistor has a base and wherein the power supply further includes a Baker clamp for limiting the charge carriers to the base of the second power transistor when its collector-emitter circuit is conducting.

* * * * *

UNITED STATES PATENT AND TRADEMARK OFFICE
CERTIFICATE OF CORRECTION

PATENT NO. : 5,097,182

DATED : March 17, 1992

INVENTOR(S) : Allen D. Kelly

It is certified that error appears in the above-identified patent and that said Letters Patent is hereby corrected as shown below:

In column 1, line 34, delete "38" and insert --"--.

In column 1, line 68, after "brightness" insert --.--.

In column 5, line 6, delete "!7" and insert --17--.

In column 6, line 7, after "pattern" insert --.--.

In column 6, line 65, delete "6!" and insert --61--.

In column 8, line 5, after "applications" insert --.--.

Signed and Sealed this

Fifteenth Day of June, 1993

Attest:

MICHAEL K. KIRK

*Attesting Officer*         *Acting Commissioner of Patents and Trademarks*